US012485053B2

(12) United States Patent
Schreiber

(10) Patent No.: US 12,485,053 B2
(45) Date of Patent: Dec. 2, 2025

(54) ZONAL PRESSURE CONTROL (ZPC) IN IMAGING ROOMS

(71) Applicant: SLD Technology, Inc., Portland, OR (US)

(72) Inventor: Kevin Joseph Schreiber, Portland, OR (US)

(73) Assignee: SLD TECHNOLOGIES, INC., Portland, OR (US)

( * ) Notice: Subject to any disclaimer, the term of this patent is extended or adjusted under 35 U.S.C. 154(b) by 750 days.

(21) Appl. No.: 17/694,377

(22) Filed: Mar. 14, 2022

(65) Prior Publication Data

US 2022/0287901 A1 Sep. 15, 2022

Related U.S. Application Data

(60) Provisional application No. 63/160,633, filed on Mar. 12, 2021.

(51) Int. Cl.
*F24F 13/06* (2006.01)
*A61G 13/10* (2006.01)
*F24F 13/08* (2006.01)
*H04N 23/54* (2023.01)

(52) U.S. Cl.
CPC .......... *A61G 13/108* (2013.01); *F24F 13/082* (2013.01); *H04N 23/54* (2023.01); *A61G 2210/50* (2013.01)

(58) Field of Classification Search
CPC . A61G 13/108; A61G 2210/50; F24F 13/082; F24F 13/08; F24F 13/06; F24F 8/10; F24F 8/192; F24F 8/20; F24F 11/0001; F24F 11/52; F24F 13/10; F24F 2110/10; F24F 2110/20; F24F 2110/30; F24F 2110/40; F24F 2110/64; F24F 2110/65; H04N 23/54
See application file for complete search history.

(56) References Cited

U.S. PATENT DOCUMENTS

| | | | | |
|---|---|---|---|---|
| 5,912,943 A * | 6/1999 | Deucher | ................ | H05G 1/02 378/167 |
| 6,101,768 A * | 8/2000 | Springstead | ...... | E04F 15/02405 52/180 |
| 2017/0003015 A1* | 1/2017 | Schreiber | ................ | A61L 9/22 |
| 2017/0101778 A1* | 4/2017 | Schreiber | ................ | E04B 9/02 |
| 2018/0008219 A1* | 1/2018 | Opheij | ................ | A61G 13/108 |
| 2019/0193508 A1* | 6/2019 | Ganem | ................ | F24F 8/10 |
| 2020/0183362 A1* | 6/2020 | Ledwith | ............... | G05B 19/414 |

* cited by examiner

*Primary Examiner* — David P Porta
*Assistant Examiner* — Mamadou Faye
(74) *Attorney, Agent, or Firm* — Evan R. Sotiriou; Burris Law, PLLC

(57) ABSTRACT

An apparatus for airflow control includes a gantry configured to couple to an imaging system and a gantry cover coupled to the gantry. The gantry cover includes a first damper having a first plurality of diffuser perforations, and a second damper having a second plurality of diffuser perforations. An alignment of the first plurality of diffuser perforations with respect to the second plurality of diffuser perforations is adjustable to define different airflow rates from a surface of the gantry toward a patient table to provide laminar airflow in obstructed areas.

21 Claims, 14 Drawing Sheets

ZONAL PRESSURE CONTROL (ZPC) IN IMAGING ROOMS

CROSS-REFERENCE TO RELATED APPLICATIONS

This non-provisional application claims the benefit of and priority to U.S. Provisional Application No. 63/160,633, filed Mar. 12, 2021. The disclosure of the prior application is hereby incorporated by reference herein in its entirety.

BACKGROUND

Medical settings, such as surgical suites, utilize devices within imaging rooms to perform different procedures, including scanning and imaging of a patient using magnetic resonance imaging (MRI), computed tomography (CT) scans, and so forth, as part of diagnostic or surgical procedures. These rooms often employ devices or systems that include a gantry, an imaging arm, and an imaging head to support and stabilize the instruments used for the scanning and imaging. The gantry, imaging arm, and imaging head are typically large and bulky, which creates an undesirable pressure zone under the surface of the gantry (e.g., blocking or creating turbulent airflow instead of laminar airflow). As such, when the patient is under the surface of these components (sometimes for extended periods of time), wherein airflow is disturbed or blocked, the airflow to the patient is less than desirable, which can result in adverse effects to the patient (e.g., post procedure infections, etc.).

Thus, while the gantry is necessary to support, for example, scanning or imaging devices to be moved toward or away from a patient, conventional gantries can also have significant drawbacks, including blocking airflow to the patient.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In various examples, an apparatus for airflow control includes a gantry configured to couple to an imaging system and a gantry cover coupled to the gantry. The gantry cover includes a first damper having a first plurality of diffuser perforations and a second damper having a second plurality of diffuser perforations. An alignment of the first plurality of diffuser perforations with respect to the second plurality of diffuser perforations is adjustable to define different airflow rates from a surface of the gantry toward a patient table to provide laminar airflow in obstructed areas.

In various examples, a medical imaging system includes a gantry having a gantry cover, wherein the gantry cover includes a top damper comprising a first plurality of diffuser perforations and a bottom damper comprising a second plurality of diffuser perforations. The medical imaging system further includes an imaging apparatus having an imaging head configured to capture images of a patient, wherein the imaging head includes a third plurality of diffuser perforations, and an imaging arm coupling the imaging head to the gantry and configured to support the imaging head.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

The examples disclosed herein may take physical form in certain parts and arrangement of parts, and will be described in detail in this specification and illustrated in the accompanying drawings which form a part hereof and wherein.

DETAILED DESCRIPTION

Figure 1:
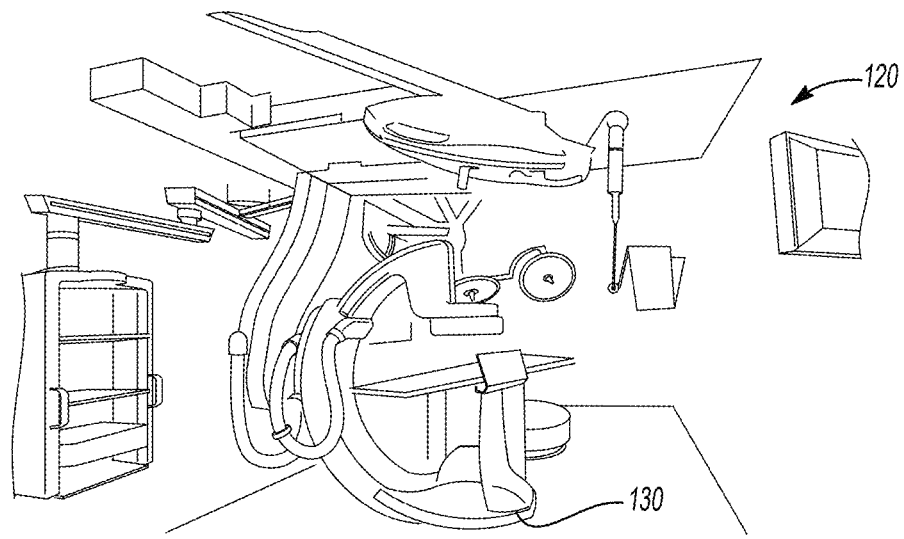
FIG. 1 illustrates an imaging room in a surgical suite in which various examples can be implemented.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Various embodiments and aspects of the present disclosure provide zonal pressure control (ZPC) to reduce airflow turbulence in, for example, imaging rooms. The ZPC is implemented in some examples in combination with an imaging device in a surgical suite or imaging room, wherein the imaging device is movable and has a gantry that includes a plurality of vents or airflow passages/openings to provide additional or controlled (e.g., directionally controlled) airflow through and/or from the gantry surface. In one or more examples, the airflow is controlled using a damper with hinged access to the vents, and diffuser covers for the vents. In some examples, the damper controls the flow of air through the plurality of vents based on an operational position being open, partially open, or closed, in. In some examples, ZPC configurations further include a plurality of vents provided in an imaging head that is supported by the gantry that allows airflow to further pass through the imaging head. As such, in one or more examples, laminar airflow is provided or maintained within the imaging room, particularly in an imaging area. For example, laminar airflow is provided below a gantry of an imaging device.

Accordingly, various examples and implementations of the present disclosure enable improved airflow throughout the surgical suite by introducing ZPC that provides unidirectional or laminar airflow under the carriage of the gantry and imaging apparatus, to the patient, and/or within the scanning/imaging or surgical zone. The ZPC configuration 100 in one or more examples, such as illustrated in FIGS. 1-7, provide a gantry 102 and an imaging apparatus, illustrated as an imaging head 114, that include a plurality of vents, or holes, to allow airflow to pass through the gantry 102 and/or the imaging head 114. In some examples, as described in more detail herein, the gantry 102 further include one or more airflow control components, such as a damper with hinged access to control the airflow through the plurality of vents and diffuser covers for the vents that can restrict airflow when restriction is desirable or needed.

More particularly, FIG. 1 illustrates an imaging room 120 in a surgical suite in which various examples described herein can be implemented. The imaging room includes a gantry 102 configured for movement along a support structure 104 (e.g., one or more rails). The gantry 102 is coupled to and configured to move an imaging device 130, such as translate the imaging device 130 (e.g., in the x-direction and/or y-direction) into and out of an imaging area. The imaging device 130 in the illustrated example includes an imaging arm 108 and the imaging head 114, wherein the imaging head 114 is movable (in one or more axes) with respect to the imaging arm 108 to allow for positioning with respect to a patient 110 supported on a patient table 106 (or other support). It should be noted that the various components, such as the gantry 102, imaging arm 108, and/or the imaging head 114 are movable in one or more directions and/or can be oriented in one or more positions. That is, the various components can be differently moved and/or positioned in different directions, along different axes, at different angles, etc. as desired or needed, such as based on particular imaging to be performed.

Figure 2:
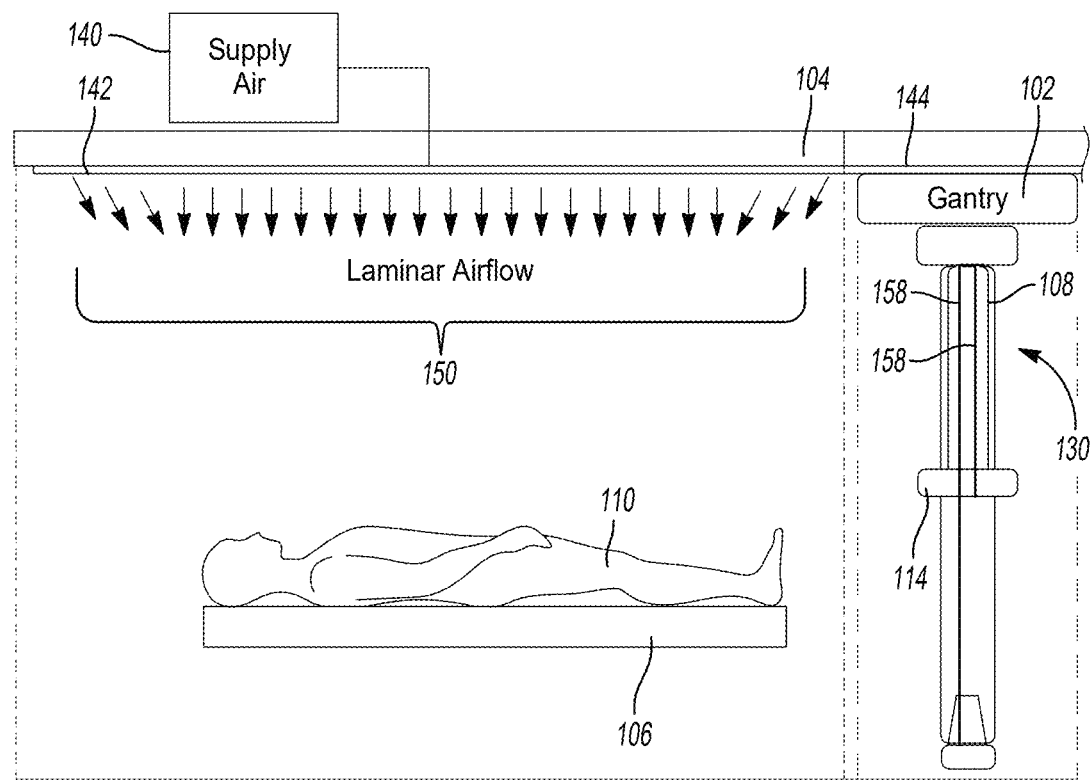
FIG. 2 is a diagram of an imaging room illustrating airflow therein.

In the illustrated example, the gantry 102 supports and stabilizes the imaging device 130 that is used, for example, for scanning or imaging of the patient 110. The gantry 102 is movable, such as along a rail system or pulley system that connects the gantry 102 to a ceiling 144 of the room, so the gantry 102 can be moved toward or away from a surface as needed. For example, the surface can be the patient table 106 or similar surface upon which the patient 110 lays on, sits on, kneels on, and so forth in order to receive a scan or image performed by the imaging device 130. The imaging arm 108 and the imaging head 114 are thereby suspended from the ceiling 144 and supported by the gantry 102 to perform the scanning or imaging. In some examples, the imaging room receives air from a supply air 140 (as illustrated in FIG. 2), such as via a plenum or manifold, wherein the air is forced into the imaging room by back pressure.

It should be noted that the various examples and configurations described herein can be modified and/or implemented in connection with different types of imaging systems having different components, such as different types and configurations of gantries and imaging apparatus. One or more examples are implementable in a surgical suite that includes the patient 110 on the patient table 106 (e.g., scan or imaging table), with the gantry 102 proximate to but moved away from the patient 110, and laminar airflow 150 provided from above the patient 110 as illustrated in FIG. 2. For example, the laminar airflow 150 is provided from one or more vents 142 in the ceiling 144 of the surgical suite. As shown by the arrows in FIG. 2, the laminar airflow 150 is directed toward the patient 110. The airflow provided directly over the patient 110 is directed down onto the patient 110, as illustrated by the vertical arrows, and the airflow at the ends of the vents are angled toward the patient 110, as illustrated by the angled arrows. As shown in FIG. 2, when the gantry 102 is moved away from or positioned away from the patient 110, there is no obstacle or impediment blocking the laminar airflow 150 from reaching the patient 110.

Figure 3:
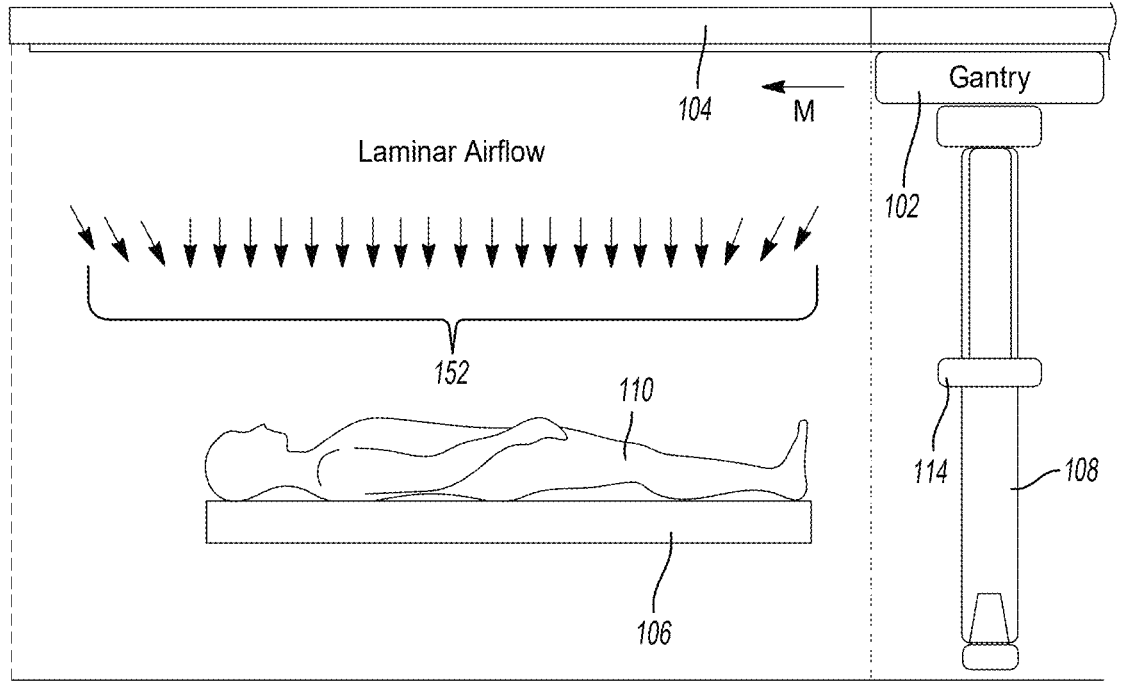
FIG. 3 is a diagram illustrating a movable imaging device according to various implementations.
Figure 4:
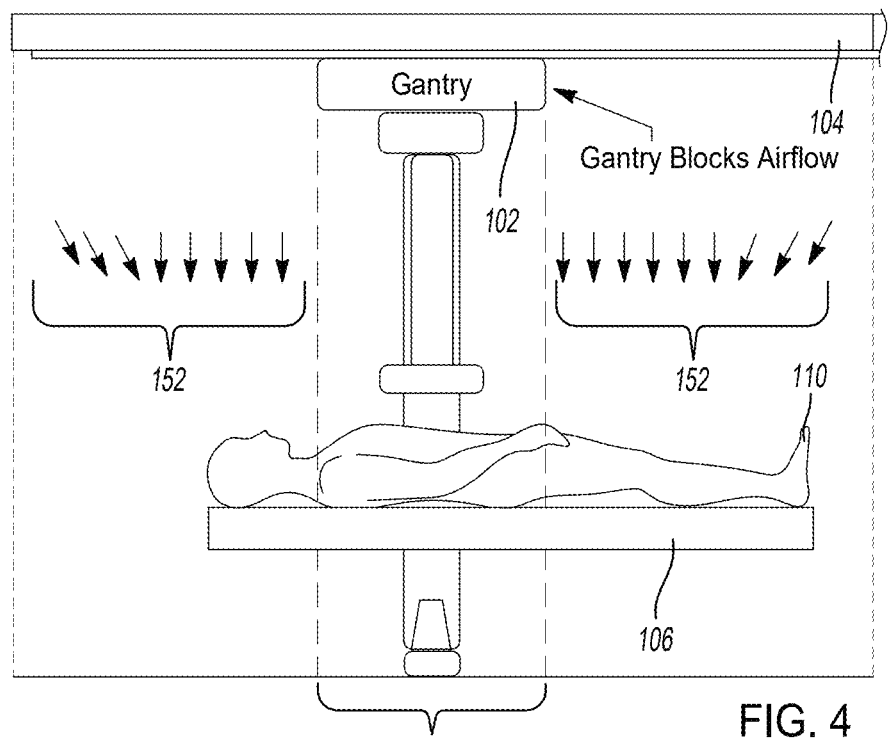
FIG. 4 is a diagram of the movable imaging device of FIG. 3 positioned with respect to a patient.

FIG. 3 illustrates the movement of the air from the vent toward the patient 110 on the table 106. For example, the arrows illustrated in FIG. 3 are closer to the patient than the arrows in FIG. 2 to show the laminar airflow 152 away from the ceiling 144 and toward the patient 110. It should be noted that although the arrows illustrate laminar airflow 150 and 152 from the ceiling 144 toward the patient 110, which illustrate that the airflow can be nearly laminar, due to external forces, such as movement throughout the surgical suite, the airflow can be shifted in small degrees, such that the airflow is not precisely laminar. In the illustrated example, the gantry 102 is preparing to move toward the patient in the direction illustrated by the arrow (M), such that the gantry 102 can be moved to an imaging position as illustrated in FIG. 4. That is, the gantry 102 is moved over (or around) the patient 110 into an imaging area 146 that allows for imaging of the patient 110. For example, the gantry 102 is moved over (and partially around) the patient 110 to be placed in a position to scan or image the patient 110. Following the completion of the scanning or imaging, the gantry 102 is moved back to the original position (e.g., non-imaging position) illustrated in FIG. 2. As shown in FIG. 4, the position of the gantry 102 physically blocks the airflow from the vents in the ceiling 144 to the patient 110. The blocked airflow can create turbulent airflow of undesirable pressure zones under the gantry 102, which is undesirable and can have adverse effects on the patient.

Figure 5:
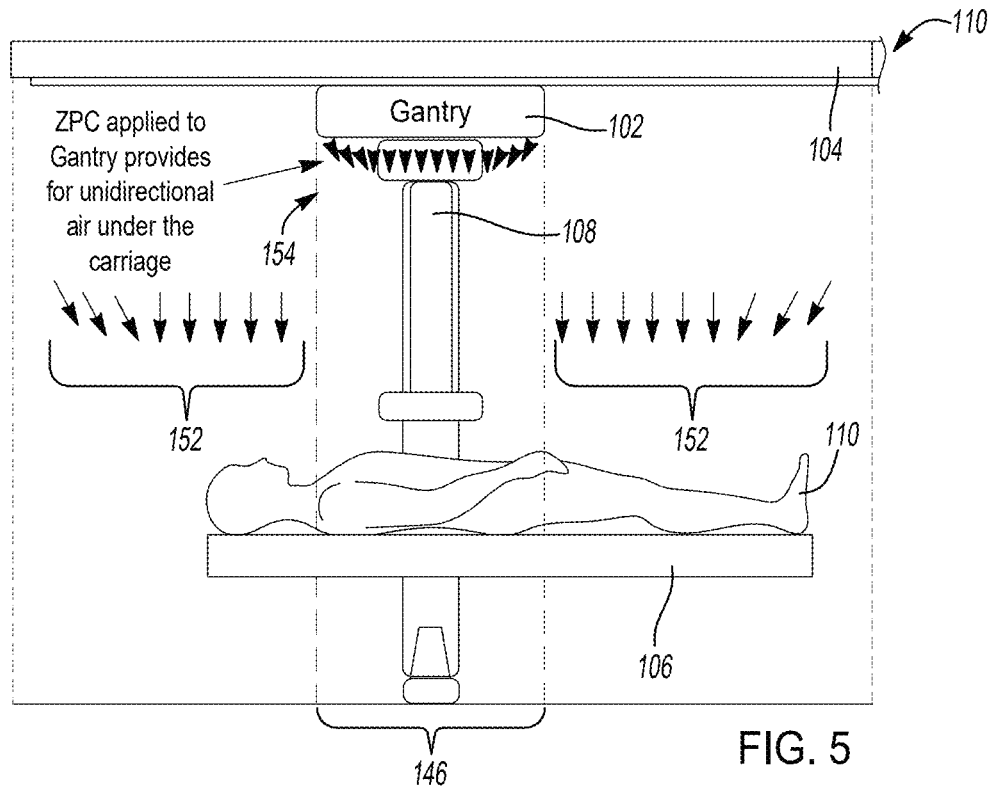
FIG. 5 is a diagram of the movable imaging device configured with airflow features according to various examples.
Figure 6:
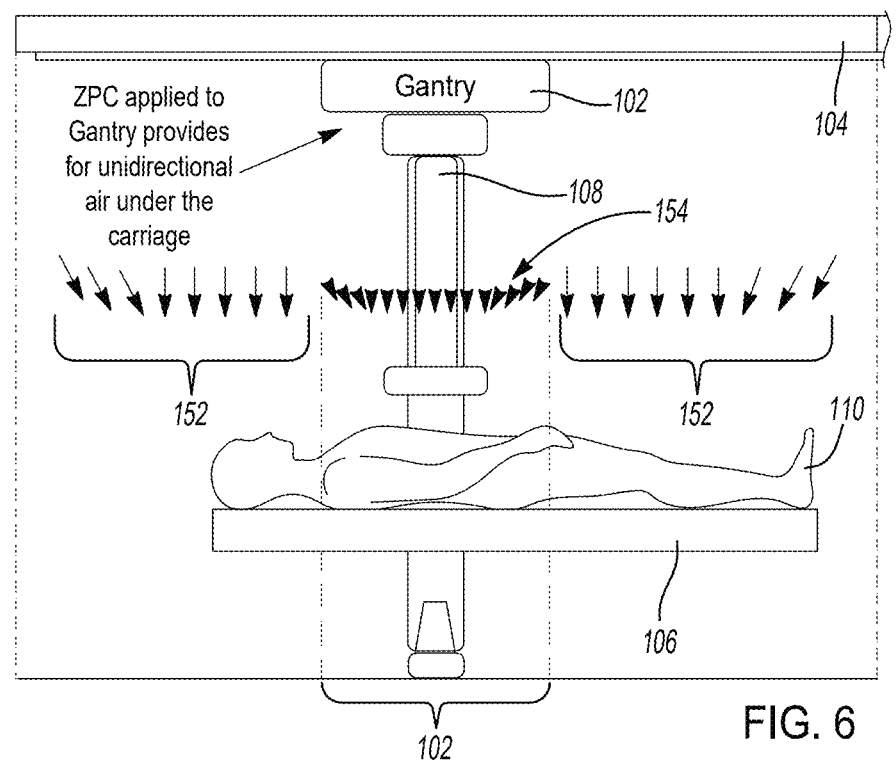
FIG. 6 is a diagram of the movable imaging device illustrating airflow features according to various examples.
Figure 7:
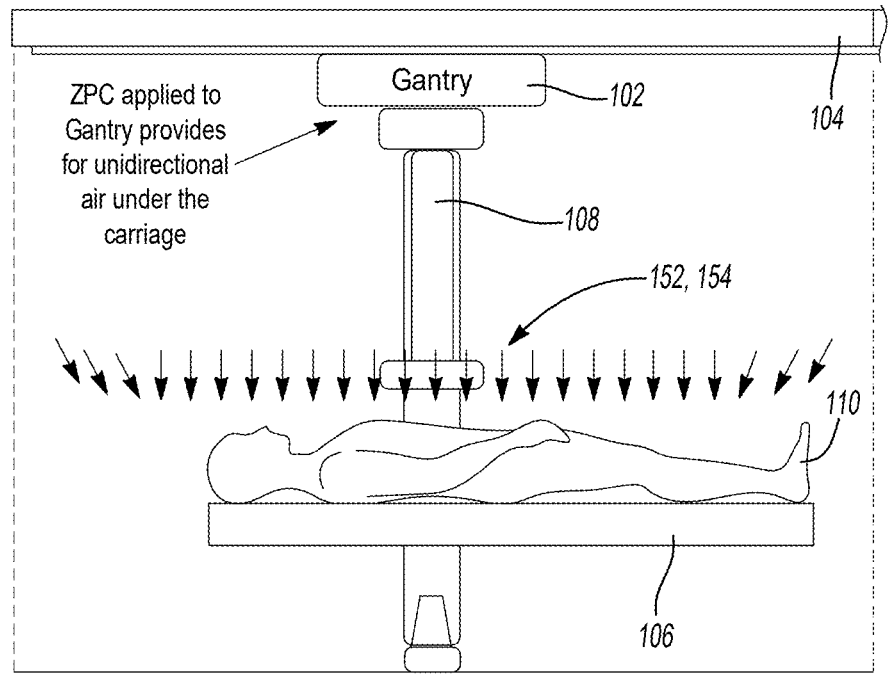
FIG. 7 is another diagram of the movable imaging device illustrating airflow features according to various examples.
Figure 8:
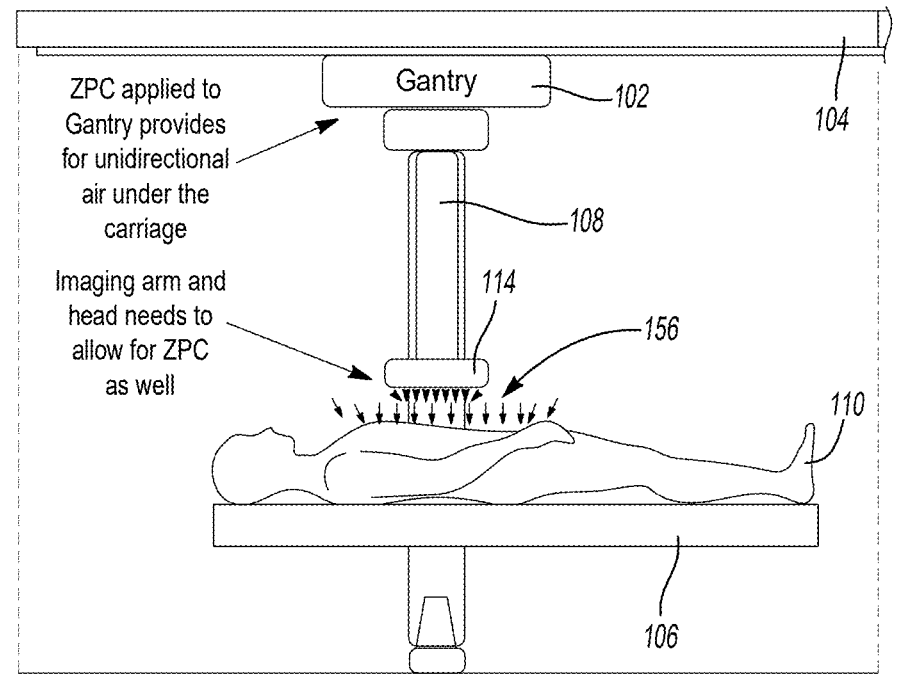
FIG. 8 is a diagram of the movable imaging device configured with airflow features at an imaging head according to various examples.

As shown in FIGS. 5-8, one or more configurations provide laminar airflow 154 through a plurality of vents in the gantry 102 and/or laminar airflow 156 through a plurality of vents in the imaging head 114. That is, FIGS. 5 and 6 illustrate laminar, or unidirectional, airflow 154 passing through the plurality of vents in the gantry 102, FIG. 8 illustrates laminar, or unidirectional, airflow 154 passing through the plurality of vents in the imaging apparatus (namely the imaging head 114), and FIG. 7 illustrates the continuation of the laminar airflow toward the patient 110 (provided by a combination of the laminar airflow 154 from the ceiling 144 and the laminar airflow 154 passing through the gantry 102 and/or the imaging head 114).

In operation, for example during imaging of the patient 110, the plurality of vents provided in the gantry 102 and in the imaging head 114 enable unidirectional air to flow under the carriage of the gantry 102 and the imaging device 130. That is, the airflow is not disturbed or blocked as in conventional arrangements. For example, the arrows illustrate the laminar airflow 152, 154 under the gantry 102 and passing through the imaging head 114 illustrate the unidirectional flow of air that would otherwise be blocked in conventional arrangements. That is, additional (and/or unobstructed) airflow to the portion of the patient 110 that is directly under the gantry 102 is not blocked in the various examples. As can be seen, in one or more examples, unidirectional airflow from the ceiling 144 continues to the patient 110 to define unobstructed laminar airflow toward the patient 110. As such, improved and/or additional airflow to the patient 110 results due to the presence of the plurality of vents in the gantry 102 and/or the imaging head 114.

It should be appreciated that the airflow through or from the gantry 102 and/or the imaging head 114 can be provided using different mechanisms and configurations. For example, one or more openings in the structures of the gantry 102 and/or the imaging head 114 allow air passage therethrough and/or therefrom in some configurations. The openings can have different shapes, sizes, spacing, configurations, etc. as desired or needed. In some examples, additional fans or mechanisms to force the air along one or more paths and through the openings is provided. However, in other examples, the airflow is directed and/or allowed to pass through the gantry 102 and/or the imaging head 114 without the use of additional components. That is, one or more examples are configured to allow airflow from the supply air 140 through the gantry 102 and/or the imaging head 114 using one or more passages or pathways 158 through the gantry 102, the imaging arm 108, and/or the imaging head 114. In some examples, one or more hollow spaces within the gantry 102, the imaging arm 108, and/or the imaging head 114 are used or configured to allow the passage of air therethrough. In other examples, dedicated airflow conduits (e.g., pipe, channel, tube, etc.) or passageways are provided that define or form the pathways 158 to allow airflow therethrough and/or between different components (see FIG. 2).

Figure 9:
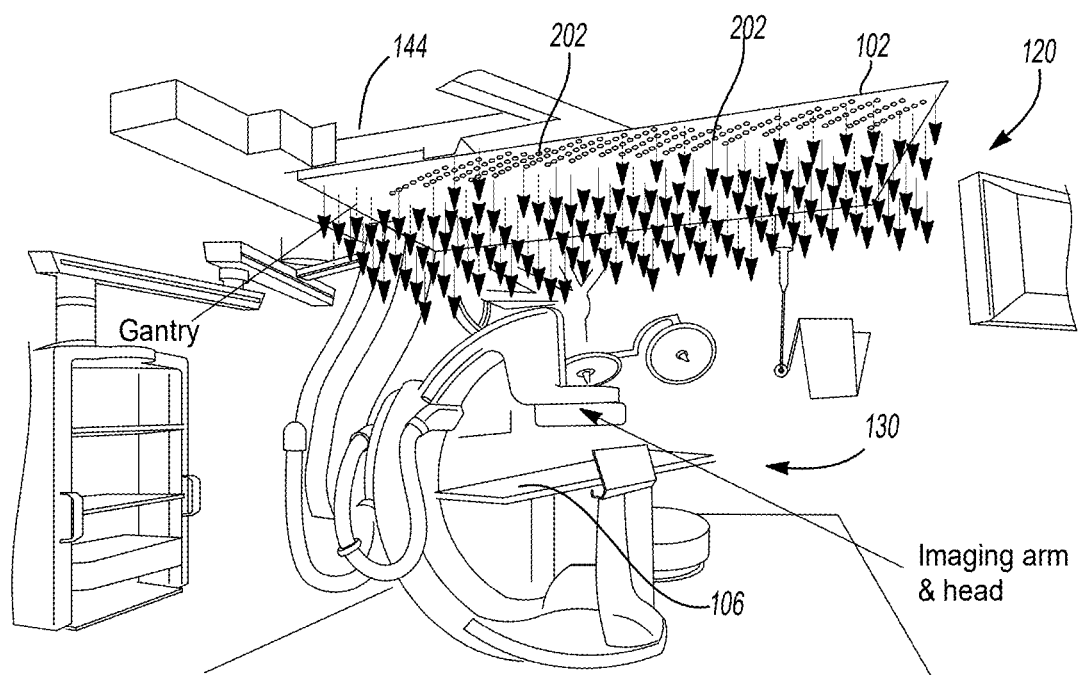
FIG. 9 is a diagram of the imaging room illustrating airflow in accordance with various examples.

Thus, one or more examples create a controlled pressure zone, such as under the gantry 102 as illustrated in FIG. 9. As can be seen, the arrows illustrate airflow from the gantry 102, namely a surface of the gantry, allowing ZPC thereunder. That is, airflow from the ceiling 144 that is blocked by the gantry 102, namely the structure of the gantry 102 moving into the airflow path to the table 106, is compensated for by the airflow from a bottom surface of the gantry 102 as described in more detail herein. With the herein described configurations, laminar airflow is thereby maintained to the table 106 when the gantry 102 is positioned above the table 106.

More particularly, FIG. 9 illustrates laminar airflow provided by a plurality of vents 202 of a portion of the imaging device 130, namely airflow through the vents 202 of the gantry 102. As described above, the imaging device 130 including the imaging arm 108 and the imaging head 114 are coupled to and supported by the gantry 102. The gantry 102 is suspended from the ceiling 144 of the surgical suite and supports the imaging device 130. Because the gantry 102 is suspended from the ceiling 144, the gantry 102 can be provided on a system that allows the gantry 102, and therefore the imaging device 130, to move toward or away from the patient 110 as needed. In various implementations or settings, the gantry 102 provides an initial barrier to airflow and the imaging device 130 provides a second barrier to airflow. Accordingly, as illustrated in FIG. 9, the ZPC is implemented with the imaging device 130 in some examples, such that the imaging device 130 operates in combination with the plurality of vents 202 to enable laminar airflow to reach the patient 110.

In one example, a display 310 is provided on a portion of the ceiling 144 that is configured to display light, an image, a series of images, or video during scanning and/or imaging of the patient 110, including during a setup process wherein the patient 110 is moved into the imaging area 146. The light, image, series of images, or video are displayed for viewing by the patient 110, such as when positioned on the patient table 106. In some examples, the display 310 includes a single large display screen or monitor and in other examples the display 310 includes a number of smaller screens or monitors that are coupled and aligned to form a larger display surface. The display 310 is communicatively coupled to a control or video system, such as a video source 504 (as shown in FIG. 19).

Figure 19:
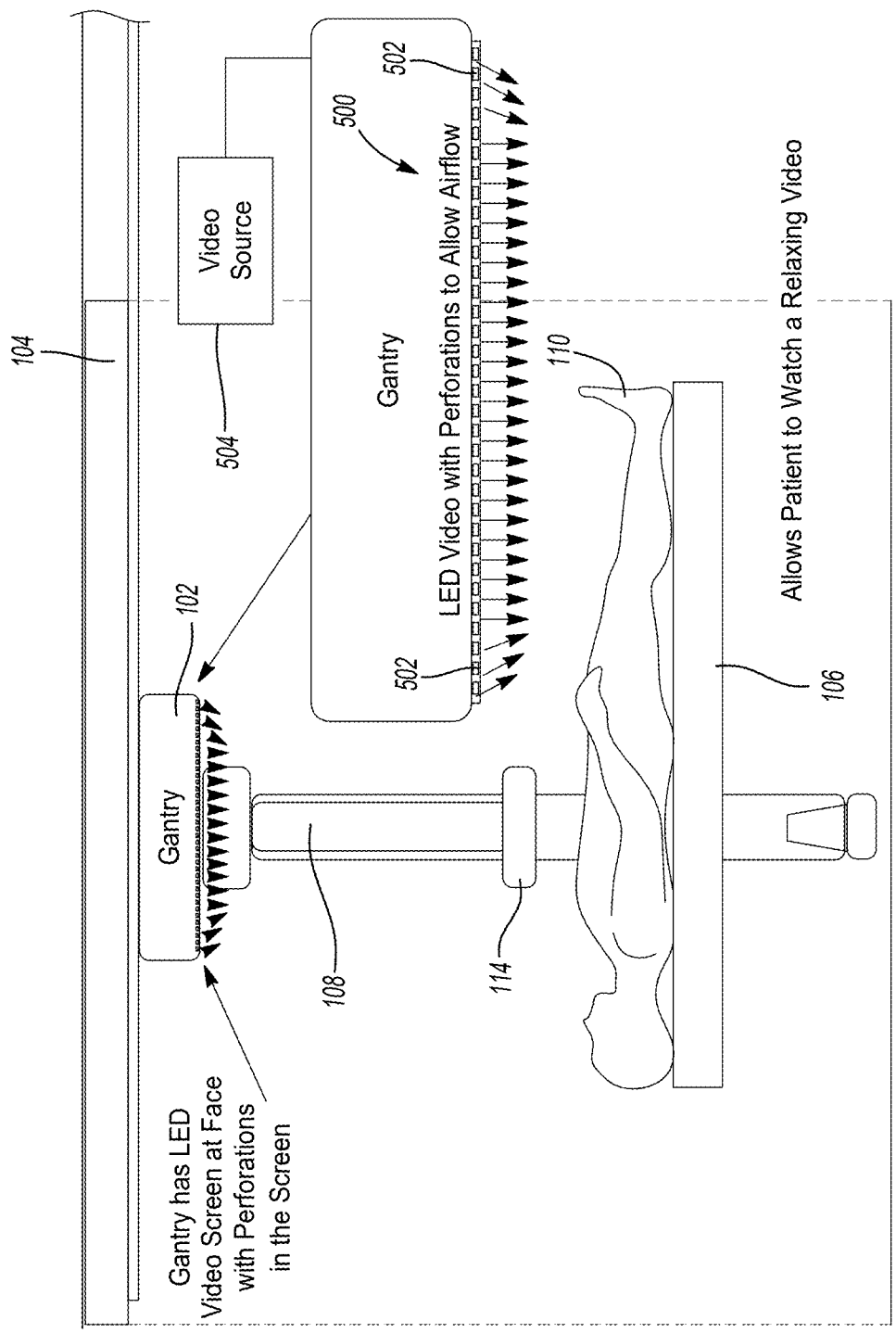
FIG. 19 is a diagram of an imaging device illustrating a gantry with a video component according to an example.

In one example, the gantry 102 also includes a display as described in more detail herein (see FIG. 19, light emitting diode (LED) panel 500). Similar to the display 310, the LED panel 500 is configured to display light, an image, a series of images, or video while the scans and images are captured and for viewing by the patient 110, as well as, for example, during the setup process. The LED panel 500 is operable independently or in combination with the display 310. When operated independently, the LED panel 500 is configured to display a local light, image, series of images, or video while the scans and images are captured and for viewing by the patient 110 (e.g., different light or content displayed on the LED panel 500 than on the display 310). When operated in combination with the display 310, the LED panel 500 is configured to display a portion of a global light, image, series of images, or video being displayed on the display 310. That is, the LED panel 500 displays, for example, a portion of the image that is being blocked from the view of the patient 110 by the gantry 102. In this example, the image being displayed by the LED panel 500 changes as the gantry 102 is moved to correspond to the portion of the image on the display 310 being blocked by the gantry 102. It should be noted that the display elements or pixels can be configured to display a basic set of colors or a large set of colors, such that displays of different display characteristics, resolutions, etc. are contemplated.

Figure 10:
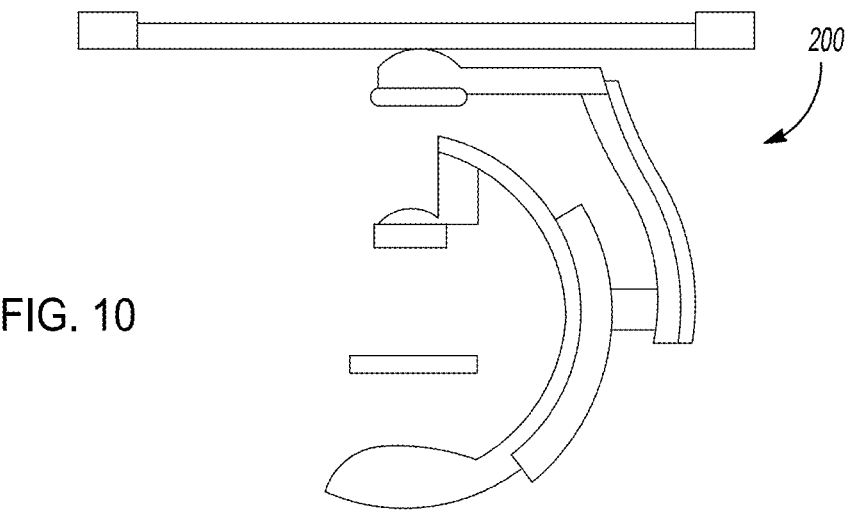
FIG. 10 is a diagram of another imaging system in which various examples can be implemented.

One or more examples can be implemented with different systems within a surgical or imaging environment, such as with different types or configurations of imaging systems. For example, one or more configurations of ZPC described herein can be used with an imaging system 200 as shown in FIG. 10. That is, air control or air management as described herein is implementable with the imaging system 200 to create a controlled pressure zone under one or more surfaces that block airflow.

Figure 11:
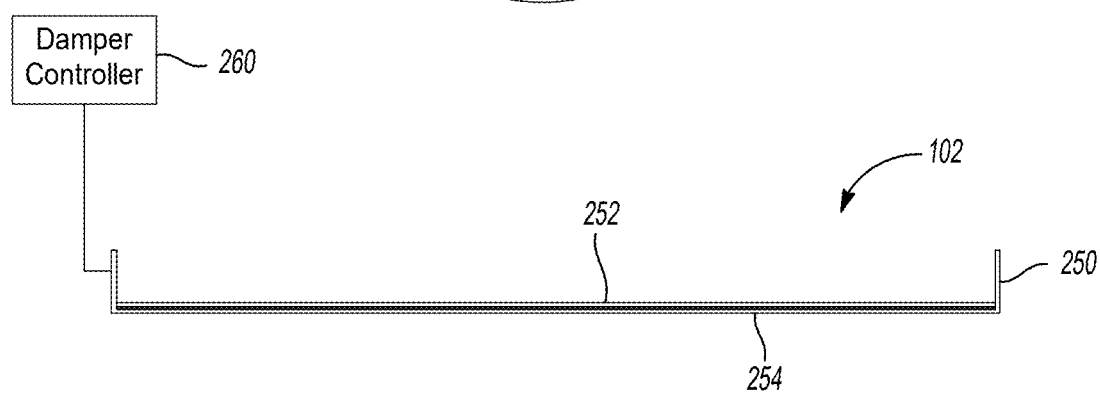
FIG. 11 is a diagram of a gantry cover according to one example in an operational configuration.
Figure 12:
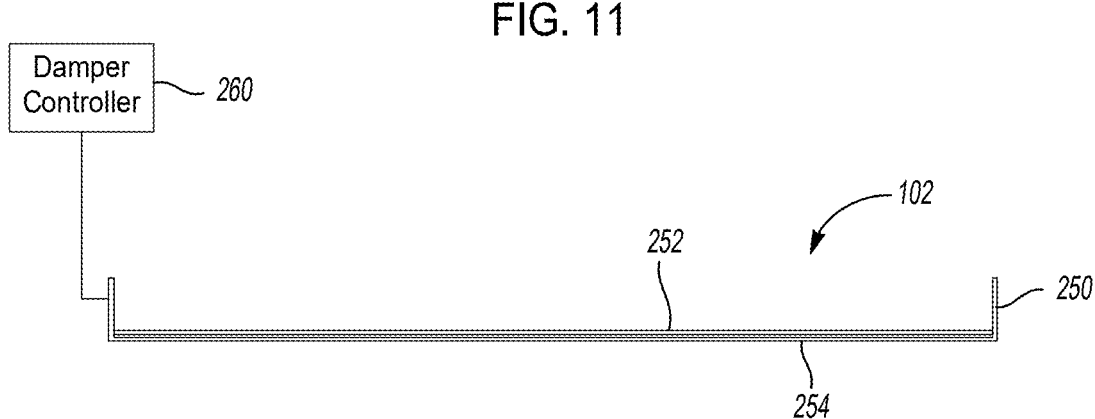
FIG. 12 is a diagram of the gantry cover of FIG. 11 is another operational configuration.
Figure 13:
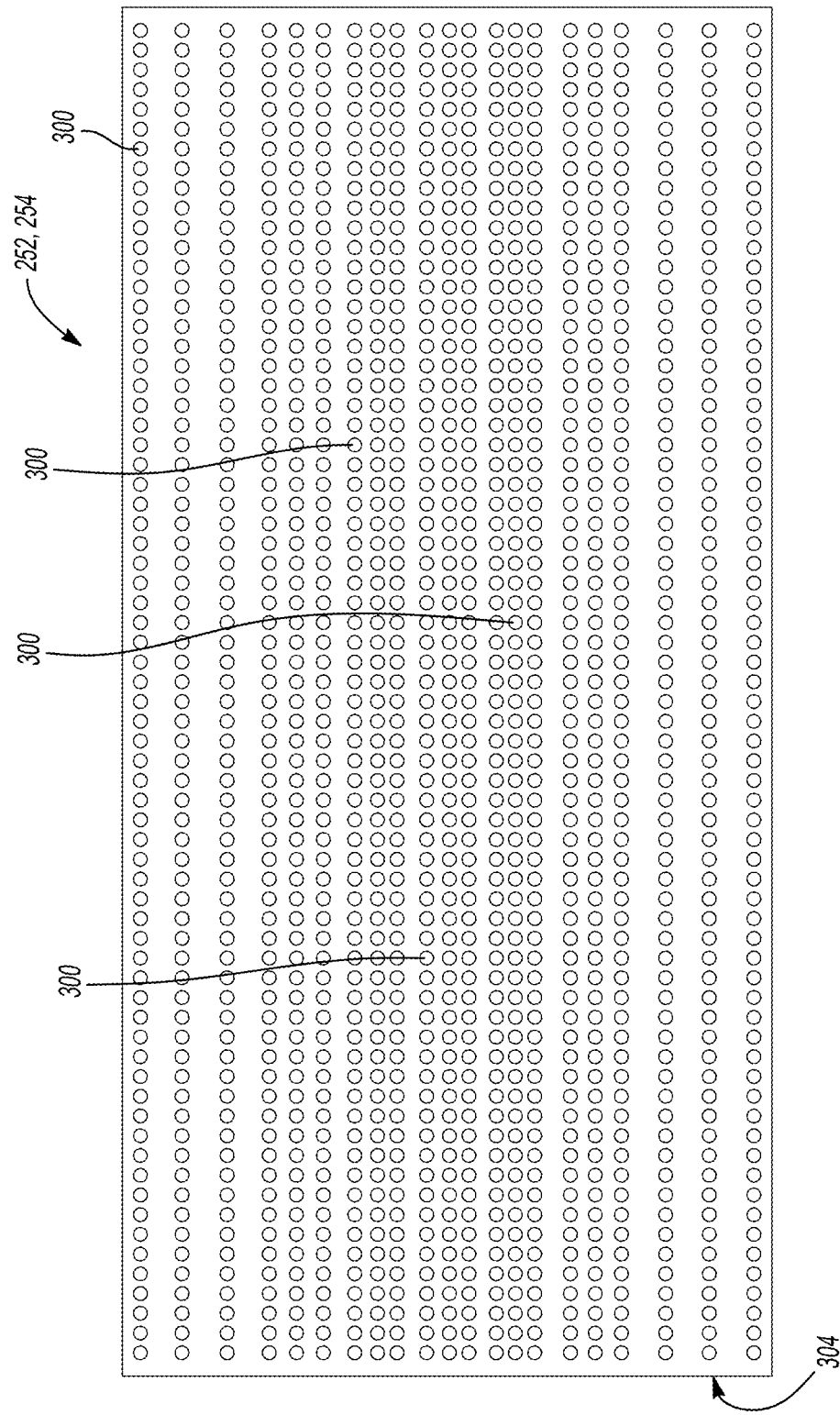
FIG. 13 is a diagram of a configuration of airflow openings of a gantry cover according to an example.
Figure 14:
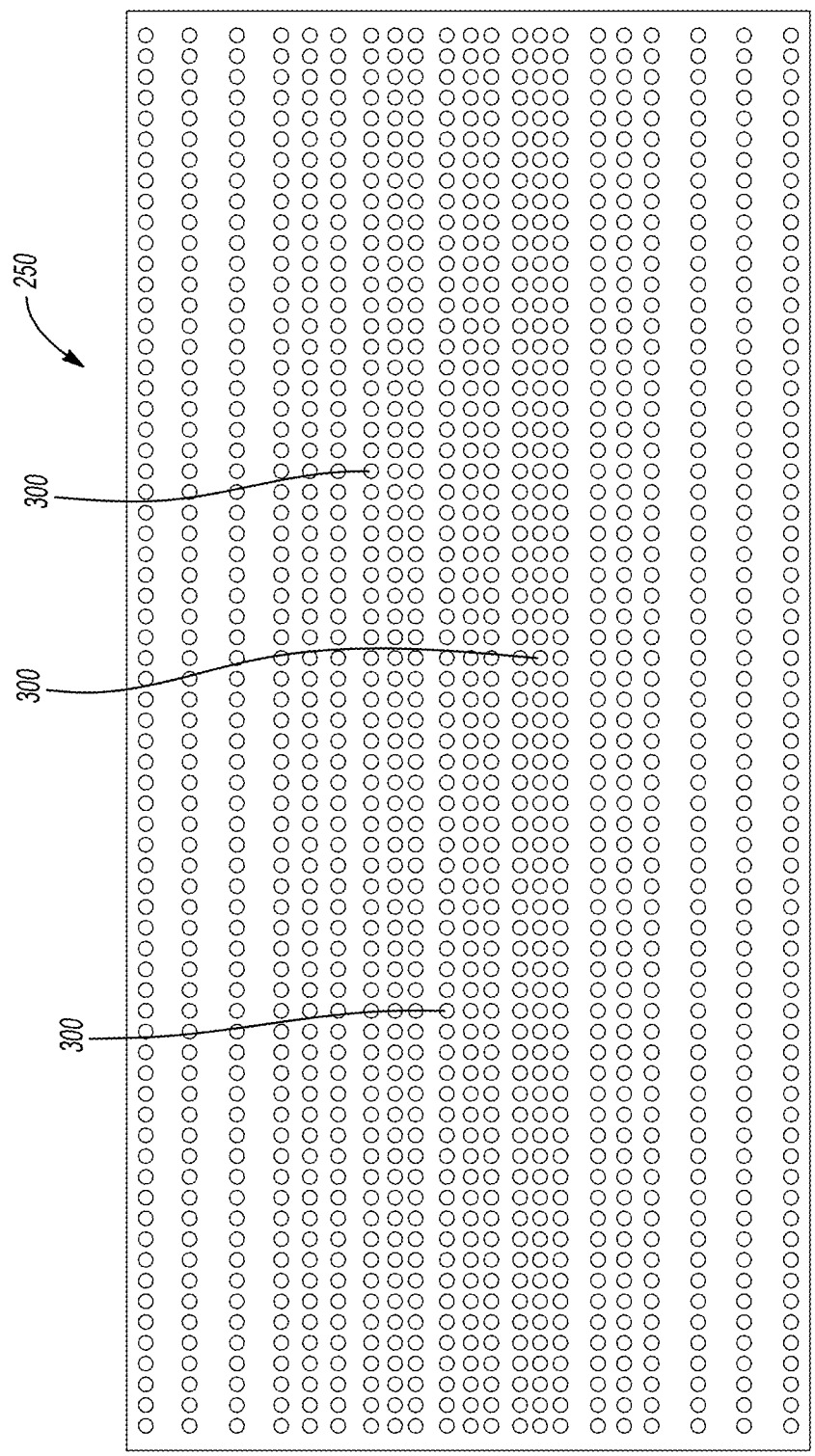
FIG. 14 is a diagram of the gantry cover of FIG. 13 in a different operational configuration.
Figure 15:
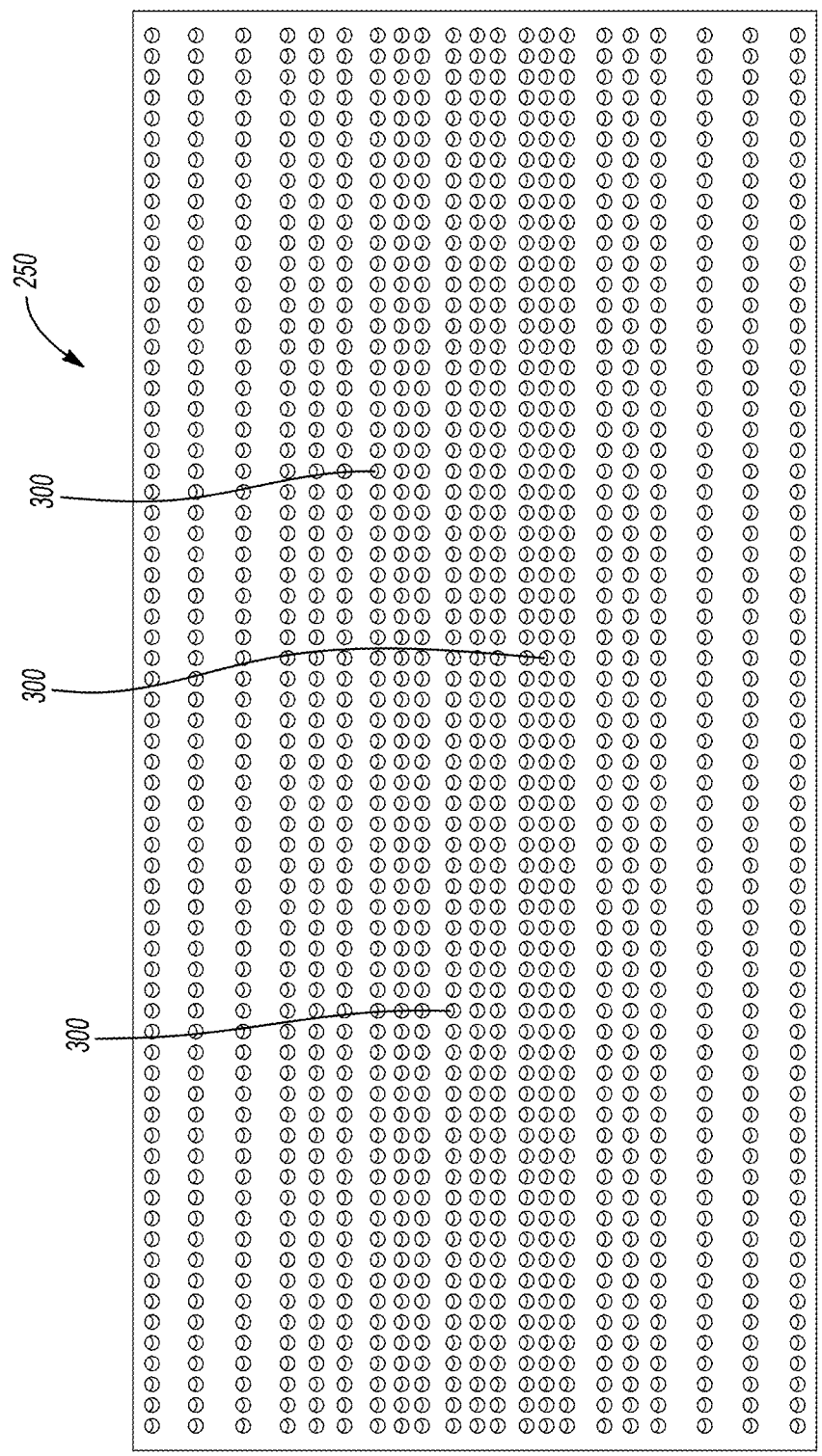
FIG. 15 is a diagram of the gantry cover of FIG. 13 in a different operational configuration.

FIGS. 11 and 12 illustrate a side view of a portion of the gantry 102, namely a gantry cover 250 that includes diffuser perforations 300 and damper control as further illustrated in FIGS. 13-15 according to various examples of the present disclosure. In some configurations, the diffuser perforations 300 are embodied or configured as the plurality of vents 202 described above. For example, the diffuser perforations 300 are holes or openings in the gantry cover 250 that enable air to flow from and/or through the gantry 102. The damper control in some examples is a damper arrangement that includes a top damper 252 and a bottom damper 254 adjacent one another that are operable to open, close, or partially open the diffuser perforations 300 to manage the airflow. In some examples, the damper control includes a damper controller 260 that is electronic and is controlled by an electronic device, such as a mobile device, a desktop computer, a laptop computer, a tablet, an electronic control panel, or any other suitable electronic means to move the damper arrangement between a fully open state, partially open states, and a fully closed state (e.g., an actuator that is automatically controlled). In some examples, the damper control is manual and is controlled by the damper arrangement, namely the top damper 252 and the bottom damper 254, being manually moved to the fully open state, the partially open states, and the fully closed state. The damper control is controlled independently of the movement of the gantry 102 in various examples. For example, the movement of the gantry 102 toward or away from the patient 110 surface does not affect the state of the damper arrangement, such as the amount of damping provided.

In some examples, the imaging device 130 further includes diffuser perforations 300 and damper control in addition to the diffuser perforations 300 and damper control of the gantry 102. The diffuser perforations 300 and damper control of the imaging device 130 in some examples is similarly configured and/or operated to the diffuser perforations 300 and damper control of the gantry 102. In some examples, the configuration of the diffuser perforations 300 and damper control of the gantry 102 can be independent of the diffuser perforations 300 and damper control of the imaging device 130. In some examples, the diffuser perforations 300 and damper control of the gantry 102 and the imaging device 130 can each be controlled by the electronic control simultaneously such that opening the damper of the gantry 102 and opening the damper of the imaging device 130 occur in combination. In another example, the diffuser perforations 300 and damper control of the gantry 102 and the imaging device 130 are independent, such that the opening of the damper of the gantry 102 can be performed without opening the damper of the imaging device 130, or the opening of the damper of the imaging device 130 can be performed without opening the damper of the gantry 102.

Different arrangements of perforations 300 and damper control are contemplated, such as different sized openings, different shaped openings, differently spaces openings, etc. Additionally, the mechanism to open, close, or partially close the perforations 300 can be performed using different control mechanisms. In some examples, the damper arrangement includes an air diffuser having a screen and a damper that extend across the opening, which may be adjusted (e.g., rotated) by a tool, such as an Allen wrench, causing the damper to open or close (in a guillotine type configuration).

As can be seen in FIGS. 11 and 12, illustrating elevation views of the gantry cover 250, the structure is configured to cover or surround a portion or all of the gantry 102 in some examples. For example, the gantry 102 includes the gantry cover 250 as the outermost layer of the gantry 102. In some examples, the gantry cover 250 is configured to couple to (or form part of) and be positioned on an underside of the gantry 102, namely on the side of the gantry 102 proximate to and facing the imaging device 130, when the gantry 102 is placed in a position surrounding the patient 110. In the illustrated example, the top damper 252 and the bottom damper 254 are arranged parallel to one another. In other words, the top damper 252 is provided parallel to the bottom damper 254 and the bottom damper 254 is provided parallel to the top damper 252 (e.g., in parallel axes). Each of the top damper 252 and the bottom damper 254 include the diffuser perforations 300 as described in more detail herein. In some examples, the top damper 252 and the bottom damper 254 include identical patterns of the diffuser perforations 300, such that the diffuser perforations 300 of the top damper 252 and the bottom damper 254 can be aligned, thereby configuring the gantry cover 250 in the fully open state allowing airflow therethrough. In other examples, the top damper 252 and the bottom damper 254 include patterns of the diffuser perforations 300 that are not identical, such as different sized, spaced, arranged, etc.

As described above, the top damper 252 is arranged parallel to the bottom damper 254, and in various examples, the top damper 252 and the bottom damper 254 are movable (e.g., slidable or translatable) with respect to each other. In one example, to open, close, or partially open the damper arrangement, one or both of the top damper 252 and the bottom damper 254 are moved to line up the diffuser perforations 300 (e.g., align the openings of the perforations 300 of the top and bottom dampers 252 and 254). In some examples, the bottom damper 254 is fixed, i.e., is not movable, and the top damper 252 slides across the bottom damper 254 to fully align, not align, or partially align the diffuser perforations 300 of the top damper 252 with the diffuser perforations 300 of the bottom damper 254. More particularly, the top damper 252 can slide across the bottom damper 254 (in one axis in some examples and in two axes in some examples) to fully align the diffuser perforations 300 of the top damper 252 with the diffuser perforations 300 of the bottom damper 254 to place the damper arrangement of the gantry cover 252 in the fully open state; the top damper 252 slides across the bottom damper 254 to partially align the diffuser perforations 300 of the top damper 252 with the diffuser perforations 300 of the bottom damper 254 to place the damper arrangement of the gantry cover 250 in the partially open state; and the top damper 252 slides across the bottom damper 254 so the diffuser perforations 300 of the top damper 252 are not aligned, i.e., separated, with the diffuser perforations 300 of the bottom damper 254 to place the damper arrangement of the gantry cover 250 in the fully closed state.

In some examples, the gantry cover 250 can be operated to be a percentage open or a percentage closed. Where the gantry cover 250 is in the fully open state, the gantry cover 250 is described as 100% open or 0% closed. Where the gantry cover 250 is in the fully closed state, the gantry cover 250 is described as 0% open or 100% closed. The gantry cover 250 is in the partially open state when the gantry cover 250 is not either 100% open or 100% closed. Accordingly, the gantry cover 250 is operable to be 1% open, 5% open, 10% open, and so forth. Similarly, the gantry cover 250 is operable to be 1% closed, 5% closed, 10% closed, and so forth.

FIG. 13 illustrates the damper 252 or 254 of the gantry cover 250 according to one example. The gantry cover 250 illustrated in FIG. 13 is representative of both the top damper 252 and the bottom damper 254 illustrated and described in the description of FIGS. 11 and 12 herein. In this configuration, the gantry cover 250 includes the top damper 252 and the bottom damper 254, each having a configuration identical to or similar to the configuration illustrated in FIG. 13. FIG. 13 illustrates the diffuser perforations 300 (e.g., the plurality of vents or air holes) provided on the gantry cover 250 that, when the gantry cover 250 is implemented on the gantry 102, allows variable or controllable air to flow through the gantry 102 and reduces or eliminates zonal pressure to thereby create a controlled pressure zone as described herein.

In some examples, the diffuser perforations 300 are distributed, or arranged, evenly across the gantry cover 250. In other words, each individual diffuser perforation 300 is an equal distance from the diffuser perforations 300 to which the diffuser perforation 300 is directly proximate. In some examples, the diffuser perforations 300 are not distributed evenly across the gantry cover 250 in order to direct a greater proportion of airflow through a particular portion of the gantry cover 250. For example, as illustrated in FIG. 13, the diffuser perforations 300 are provided in a denser pattern toward a center 304 of the gantry cover 250. By providing the diffuser perforations 300 more densely toward the center 304 of the gantry cover 250, the airflow can be concentrated through the portion of the gantry cover 250 that is directly over the patient 110 to provide maximum airflow to the patient 110. In some examples, providing the diffuser perforations 300 more densely toward the center 304 of the gantry cover 250 generates uniform airflow through the gantry cover 250 and, accordingly, through the gantry 102. It should be noted that the size and shape of the perforations 300, as well as the configuration of each individual perforation 300 can be varied. For example, some of the perforations 300 can include angled or tilted openings.

FIGS. 14 and 15 illustrate different operational configurations of the gantry cover 250, wherein the gantry cover 250 includes the top damper 252 and the bottom damper 254, each configured as described herein. The gantry cover 250 shown in FIG. 14 illustrates the gantry cover in the fully open, i.e., 100% open, state. The fully open state of the gantry cover 250 enables maximum airflow through the gantry cover 250. As shown in FIG. 14, in the fully open state, the diffuser perforations 300 of the top damper 252 are fully aligned with the diffuser perforations 300 of the bottom damper 254. In various examples, fully aligned means 100% aligned, completely aligned, and so forth.

The gantry cover 250 shown in FIG. 15 illustrates the gantry cover 250 in the partially open state. The partially open state of the gantry cover 250 enables an amount of airflow through the gantry cover 250 that is less than the maximum airflow as when the gantry cover 250 is in the fully open state, but greater than zero airflow through the gantry cover 250 as when the gantry cover 250 is in the fully closed state. It should be noted that the opening and closing of the diffuser perforations 300 controls the amount of airflow, as well as other airflow characteristics or properties, such as the direction of airflow, etc. in various examples.

The air supply for the airflow in various examples can be from different sources. In one example, as described herein, the imaging or surgical room receives air from a plenum or manifold that is forced into the imaging room by back pressure. The air to the plenum or manifold is thereby received from another air supply, such as the supply air 140. That is, the gantry 102 acts a passive system to control the supplied air as described herein. In other examples, an active system is provided. That is, the gantry 102 is an active system that includes air supply components, such as a motor and fan that pressurizes and drives air through the vents 142 configured as the perforations 300.

Figure 16:
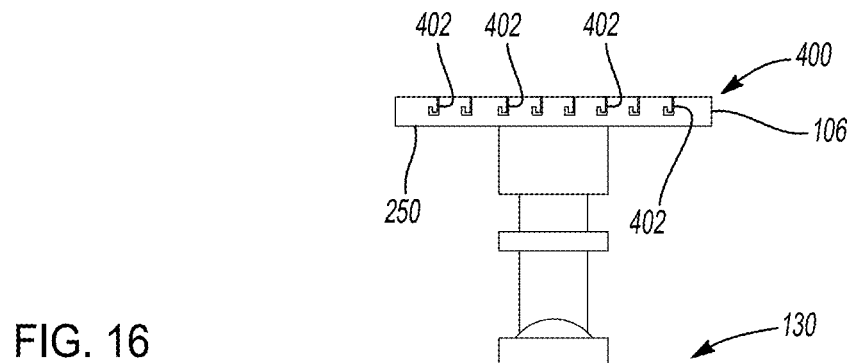
FIG. 16 is a diagram of a gantry having wire management according to an example.
Figure 17:
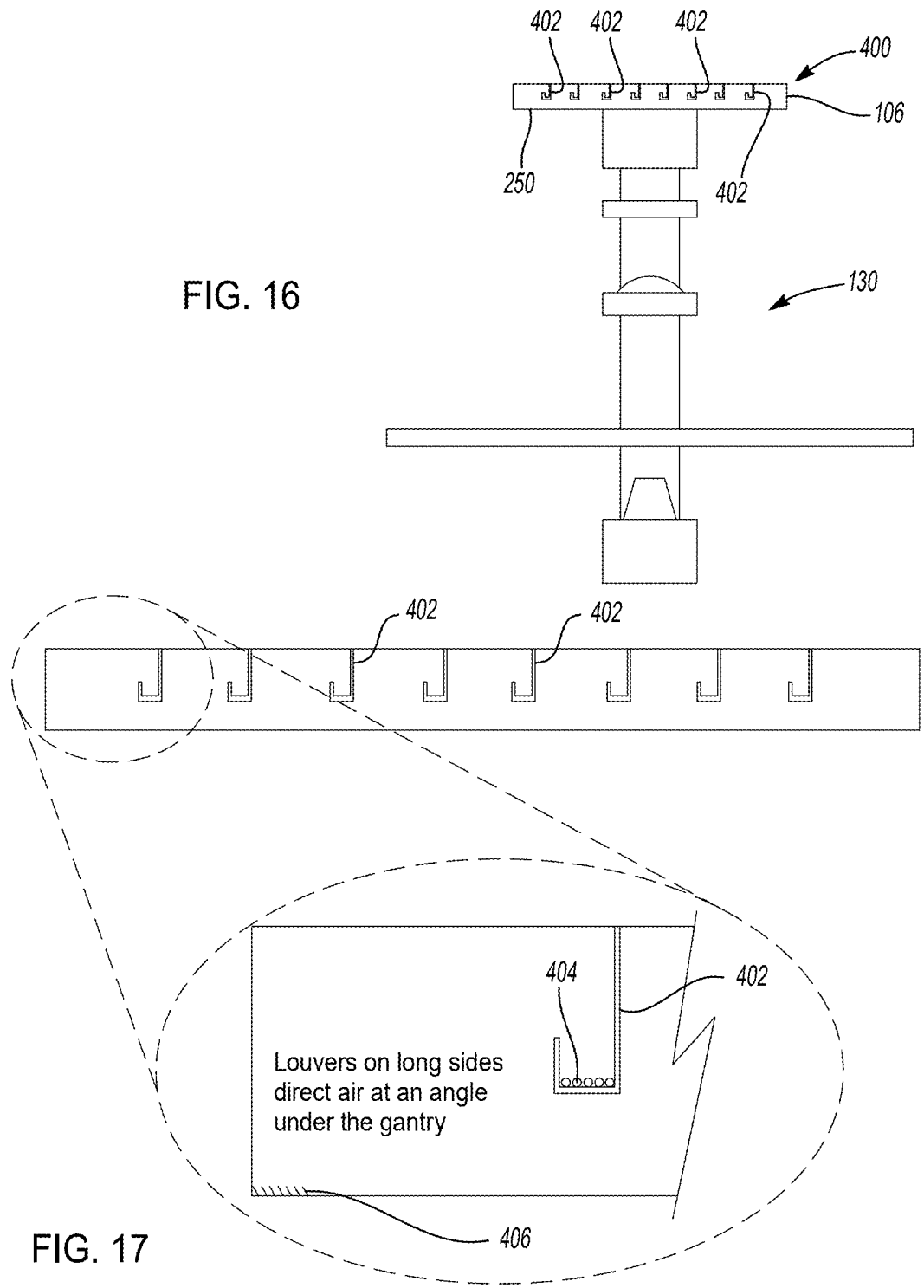
FIG. 17 is a diagram of a gantry cover illustrating wire management according to an example.
Figure 18:
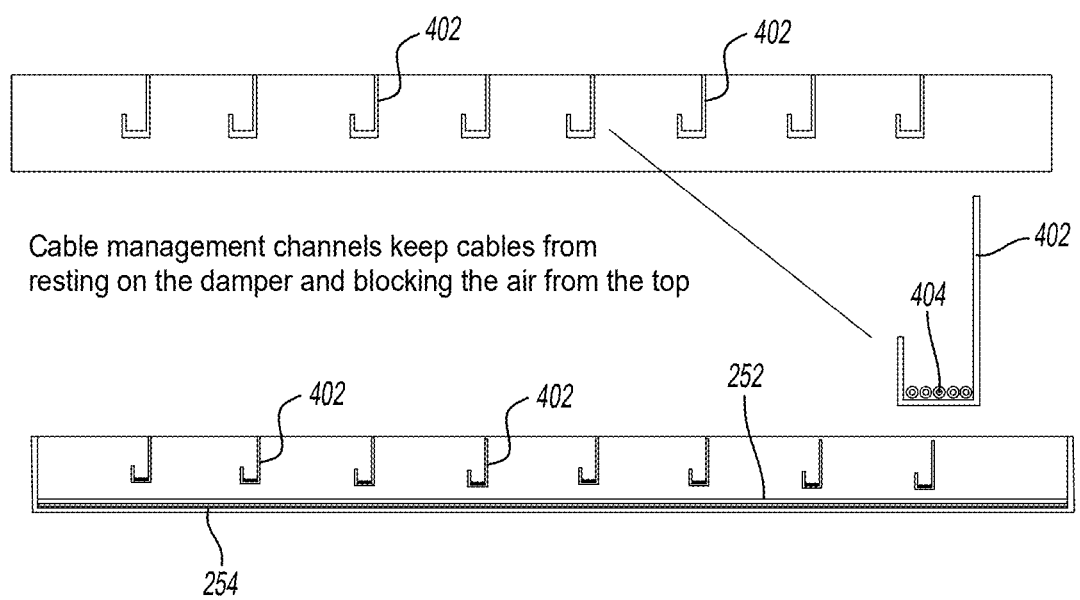
FIG. 18 is another diagram of a gantry cover illustrating wire management according to an example.

In addition to providing diffuser perforations 300 in the gantry cover 250, various examples further provide a gantry cable management system 400 as illustrated in FIGS. 16-18.

The cable management system 400 manages the cables, wires, etc. that are provided to and through the gantry 102, for example electrical cables, power cables, and so forth, such that the cables are moved or removed from interfering with the airflow through the gantry 102. Conventional systems allow the electrical cables, power cables, etc. to be placed directly on the gantry cover. However, placing the cables directly on the gantry cover 250 reduces the efficiency and minimizes the advantages of the diffuser perforations 300 disclosed herein. Accordingly, one or more examples provide the cable management system 400 as described herein to further facilitate the ZPC and maximize the efficiency and effectiveness of the diffuser perforations 300. That is, the cable management system 400 is configured to store, arrange, and/or maintain cables 404, such as electrical wires, power cords, etc. that are used by the imaging system. The cable management system 400 maintains the cables 404 above and away from the vents in the gantry cover face in order to prevent the cables from blocking airflow through the vents 202.

More particularly, FIG. 16 illustrates a front view of the gantry 102 and imaging device 130 according to various examples. The gantry 102 illustrated in FIG. 16 includes the cable management system 400. As noted herein, the cable management system 400 provides organization of the cables 404 for the gantry 102 and, in some examples, for the imaging device 130, such that the cables 404 reside among the components of the cable management system 400 rather than directly on the gantry cover 250. In some examples, the cable management system 400 includes one or more of retaining members 402, such as hooks, rails, ties, tunnels, passageways, sleeves, or additional compartments within the gantry 102 and/or above the gantry cover 250. For example, FIG. 16 illustrates a series of retaining members 402 configured as hooks to hold the cables 404 above and off of the gantry cover 250.

FIGS. 17 and 18 illustrates an internal, cut-through view of a portion of the gantry 102 according to one example. As can be seen, the gantry 102 includes the retaining members 402 (illustrated as hooks) that comprise at least a part of the cable management system 400, a plurality of cables 404 arranged and supported on the plurality of hooks, and a louver 406 on an interior portion of the gantry 102. The retaining members 402 in some examples include means to removably couple or lock the cables 404 to the retaining members 402. The louvers 406 inside the gantry 206 are angled such that airflow is directed away from the edges and corners of the inside of the gantry 102 and directed through the diffuser perforations 300 of the top damper 252 and the bottom damper 254. It should be noted that any suitable air control or directing members can be used.

Variations and modifications are contemplated. In one example, as illustrated in FIG. 19, the gantry 102 further includes a display, which is an LED panel 500 on the underside of the gantry 102 (e.g., forming part of the gantry 102 or being a cover for the gantry 102). The LED panel 500 includes a plurality of perforations 502 (e.g., openings or vents). In one example, the perforations 502 are vents that extend around an exterior perimeter of the LED panel 500. In another example, the perforations 502 are incorporated into the LED panel 500, such as formed between pixel elements of the LED panel 500. That is, the LED panel 500 in one example is a perforated LED display. In some examples, the pixels (or pixel elements) of the LED panel 500 are separated by a gap or distance (e.g., spaced apart) to allow airflow therethrough as shown in FIG. 9 (e.g., arrows represent airflow through the gaps or spacing). In other examples, strips of LEDs or pixel elements are arranged with a gap or distance therebetween, such that airflow is provided between rows of the LEDs or pixel elements. It should be appreciated that different configurations of LED elements are contemplated that allow for airflow between and/or around the LED elements. That is, the display space can be differently configured to have spacing or gaps that allow for airflow between all or a subset of the LED elements.

Incorporating the LED panel 500 with the plurality of vents further enhances the experience of the patient 110 by providing a mechanism that allows the patient 110 to view different configurations of light, an image, a series of images, or video while the scans and images are captured. In one example, the LED panel 500 is connected to the video source 504 allowing display of images or video on the LED panel 500. It should be noted that the air supply for the perforated LED panel 500 is provided from the supply air 140 in some examples, and from a local source (e.g., a local fan within a housing unit of the LED panel 500) in some examples.

In one example, the gantry 102 includes diffuser perforations 300 and the LED panel 500 (e.g., an LED screen), wherein the bottom damper 254 of the gantry cover 250 of the gantry 102 includes both LEDs and diffuser perforations 300 arranged in a pattern that enables both improved airflow and an image, series of images, or video to be displayed on the bottom damper 254. In some examples, the bottom damper 254 includes a particular pattern of diffuser perforations 300 that is also conducive to the addition of a series of LEDs as described herein. In some examples, the top damper 252 includes a particular pattern of diffuser perforations 300 that matches the pattern on the bottom damper 254 to enable the gantry cover 250 to be provided in the fully closed state, or that substantially matches the pattern on the bottom damper 254 to enable the gantry cover 250 to be provided in the partially closed state.

It should be noted that the LEDs can be configured to provide different operations or functions. In some examples, the LEDs are configured to act as image pixels, such as for generating an image, video, or other display. In some examples, the LEDs are configured to act as illuminating elements, such as to illuminate a portion of the room, the patient table, etc.

Thus, some examples further provide a screen on the gantry cover 250 comprised of LEDs for image display and/or customized lighting. It should be noted that the LED panel 500, configured as an LED screen, can include the diffuser perforations 300 to allow airflow to flow through the gantry cover 250 as described herein, while the LED portions of the LED panel 500 are configured to display different light patterns, an image, series of images, or video, as described herein. For example, FIG. 19 illustrates the patient 110 watching a video while being scanned or imaged. By providing a mechanism to allow the patient 110 to relax more than the patient 110 otherwise might relax, allows the scan or image to be more accurate and enables more effective patient care in some examples.

Figure 20:
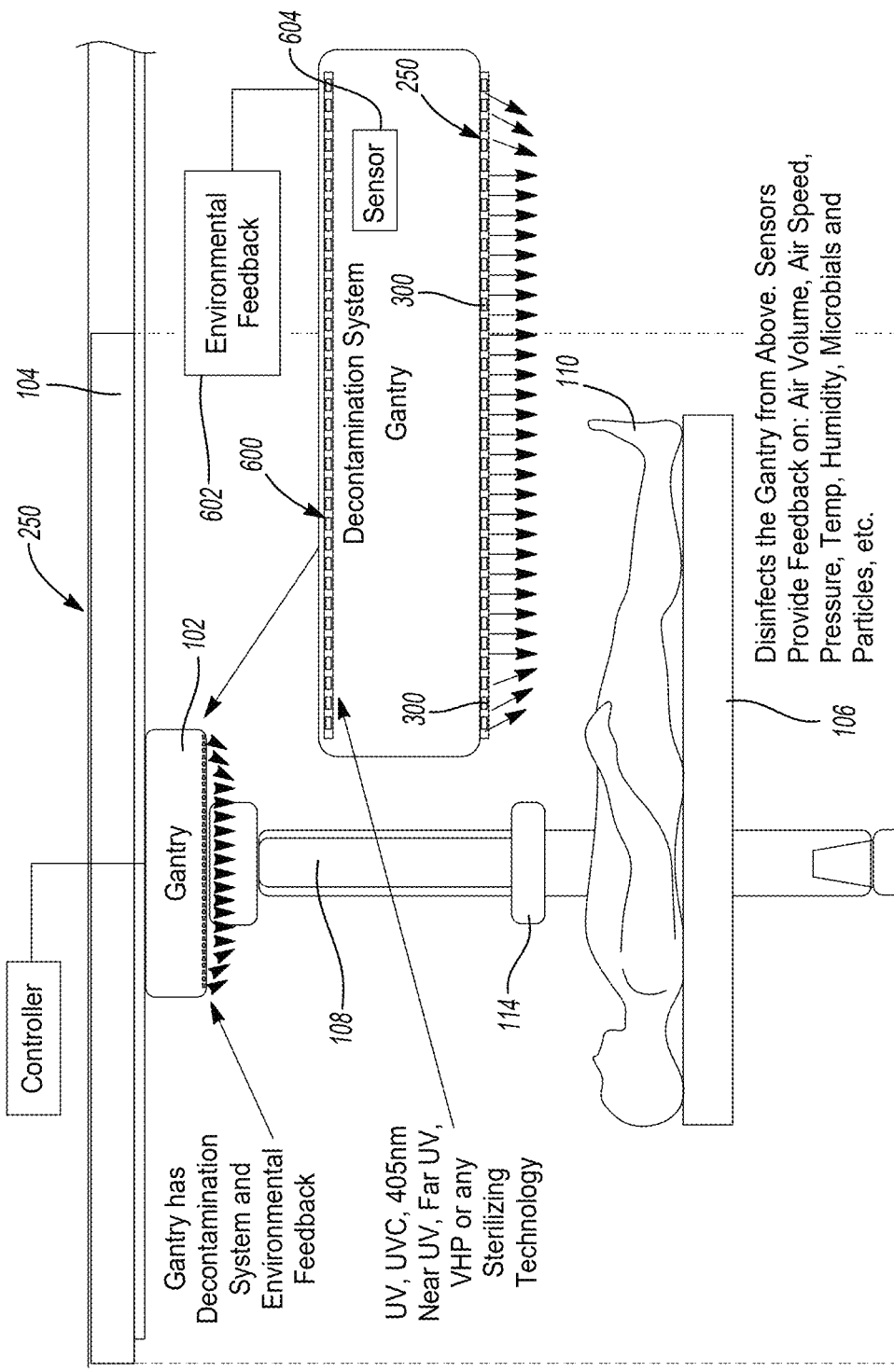
FIG. 20 is a diagram of an imaging device illustrating a gantry with a decontamination system according to an example.

As another example of a variation or modification, some implementations further provide decontamination and environmental feedback elements as part of the ZPC. For example, FIG. 20 illustrates the gantry 102 that includes a decontamination system 600 having an environmental feedback element 602. In this example, the decontamination system 600 decontaminates the air prior to the airflow passing through the gantry cover 250. In some examples, the decontamination system 600 is configured to clean the air, purify the air, and/or sterilize the air, and so forth. The decontamination system 600 in various examples includes a decontaminator to decontaminate the air. The decontaminator in some examples is comprised of one or more elements configured to remove contaminants from the air. The one or more elements can be, for example, one or more of an ultraviolet (UV) light, UVC light, 405 nm near UV light, FAR UV light, vaporized hydrogen peroxide (VHP), or any other suitable decontaminating element (that can use decontaminators other than light). The decontaminator is provided such that the airflow passes through the decontaminator prior to passing through the diffusor perforations 300 and flowing to the area where the patient 110 is scanned or imaged. The decontaminator further operates to regularly disinfect the gantry 102 in addition to the air passing through the gantry 102 in some examples. In other words, the gantry 102 is disinfected by the decontaminator from above.

In some examples, the decontaminator or other air cleaner removes particulate and bacterial contaminants surgical staff may carry into the room that may be dispersed directly above a surgical site in the absence of filtered, downward, unidirectional flow. It should be noted that any air cleansing or air purifying device or mechanism may be used, including any type of mechanical or electrical air filtering device, air sterilizing device and/or air purifying device that is in the airflow path, which may, for example, remove particulates and/or microbials from the airflow, cleanse the air and/or deliver cleaning agents or chemicals in the airflow, among providing other air filtering, air sterilizing or air purifying arrangements.

FIG. 20 further illustrates an environmental feedback element 602. The environmental feedback element 602 in some examples includes one or more sensors 604 that provide feedback on various elements of the airflow system. For example, the sensors 604 can be sensing or measuring devices that capture data and provide feedback on air volume, air speed, air pressure, temperature, humidity, microbials and particles, and so forth. The feedback from the sensors 604 is used to control the treatment for the air prior to passing through the gantry 102 to the patient area in some examples.

Figure 21:
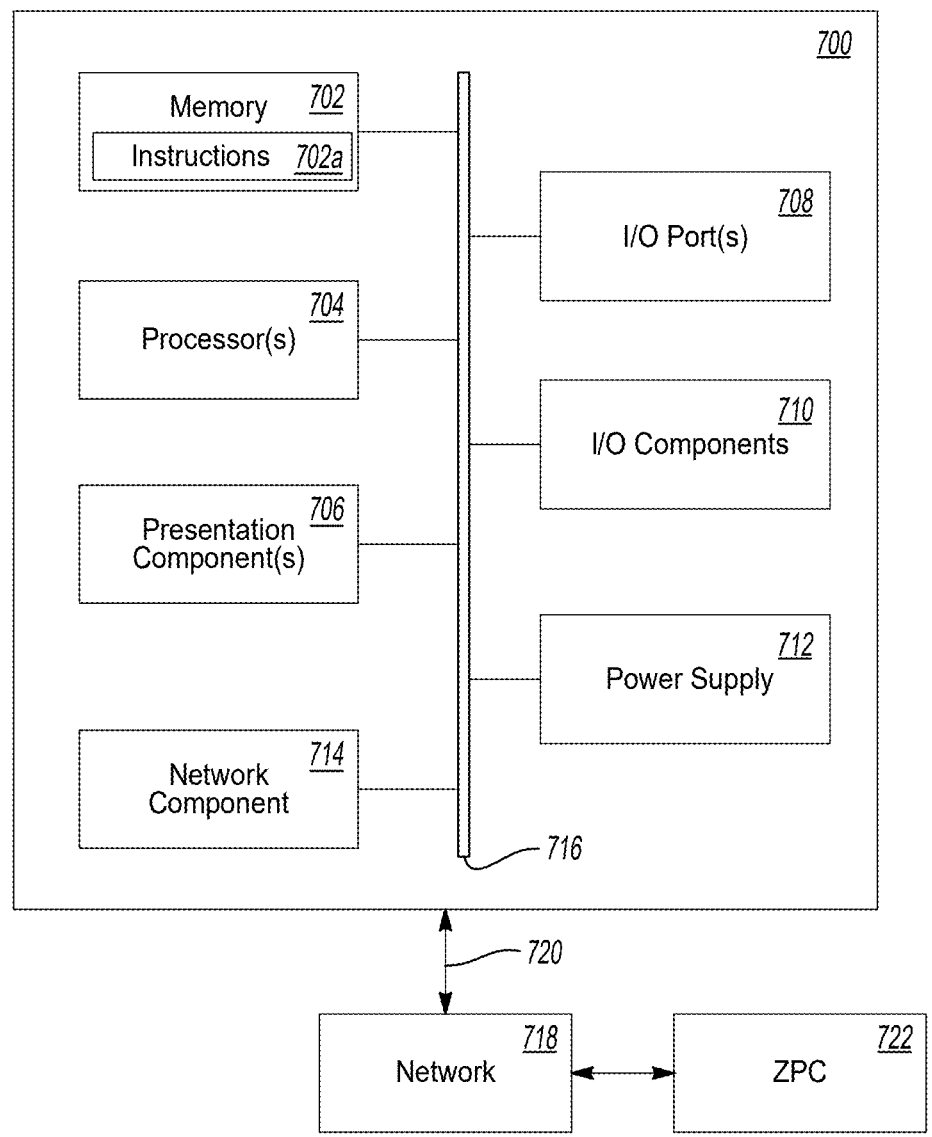
FIG. 21 is a block diagram of a computing environment suitable for implementing various examples.

A computing device suitable for implementing various aspects of the disclosure (e.g., one or more controllers) is now described (such as to control one or more operations described herein). With reference now to FIG. 21, a block diagram of a computing device 700 suitable for implementing various aspects of the disclosure as described (e.g., communicating with one or more ZPC components 722). It should be noted that the computing device 700 or a portion thereof can be communicatively coupled to the ZPC configuration 100 or form part of the ZPC configuration 100. FIG. 21 and the following discussion provide a brief, general description of a computing environment in/on which one or more or the implementations of one or more of the methods and/or systems set forth herein may be implemented. The operating environment of FIG. 21 is merely an example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, mobile consoles, tablets, media players, and the like), multiprocessor systems, consumer electronics, mini computers, mainframe computers, distributed computing environments that include any of the above systems or devices, and the like.

Although not required, implementations are described in the general context of "computer readable instructions" executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

In some examples, the computing device 700 includes a memory 702, one or more processors 1004, and one or more presentation components 706 (e.g., displays). The disclosed examples associated with the computing device 700 are practiced by a variety of computing devices, including personal computers, laptops, smart phones, mobile tablets, hand-held devices, consumer electronics, specialty computing devices, etc. Distinction is not made between such categories as "workstation," "server," "laptop," "hand-held device," etc., as all are contemplated within the scope of FIG. 21 and the references herein to a "computing device." The disclosed examples are also practiced in distributed computing environments, where tasks are performed by remote-processing devices that are linked through a communications network. Further, while the computing device 700 is depicted as a single device, in one example, multiple computing devices work together and share the depicted device resources. For instance, in one example, the memory 702 is distributed across multiple devices, the processor(s) 704 provided are housed on different devices, and so on.

In one example, the memory 702 includes any of the computer-readable media discussed herein. In one example, the memory 702 is used to store and access instructions 702a configured to carry out the various operations disclosed herein. In some examples, the memory 702 includes computer storage media in the form of volatile and/or nonvolatile memory, removable or non-removable memory, data disks in virtual environments, or a combination thereof. In one example, the processor(s) 704 includes any quantity of processing units that read data from various entities, such as the memory 702 or input/output (I/O) components 710. Specifically, the processor(s) 704 are programmed to execute computer-executable instructions for implementing aspects of the disclosure. In one example, the instructions 702a are performed by the processor 704, by multiple processors within the computing device 700, or by a processor external to the computing device 700. In some examples, the processor(s) 704 are programmed to execute instructions such as those illustrated in the flow charts discussed herein and depicted in the accompanying drawings.

In other implementations, the computing device 700 may include additional features and/or functionality. For example, the computing device 700 may also include additional storage (e.g., removable and/or non-removable) including, but not limited to, magnetic storage, optical storage, and the like. Such additional storage is illustrated in FIG. 21 by the memory 702. In one implementation, computer readable instructions to implement one or more implementations provided herein may be in the memory 702 as described herein. The memory 702 may also store other computer readable instructions to implement an operating system, an application program and the like. Computer readable instructions may be loaded in the memory 702 for execution by the processor(s) 704, for example.

The presentation component(s) 706 present data indications to an operator or to another device. In one example, the presentation components 706 include a display device, speaker, printing component, vibrating component, etc. One skilled in the art will understand and appreciate that computer data is presented in a number of ways, such as visually in a graphical user interface (GUI), audibly through speakers, wirelessly between the computing device 700, across a wired connection, or in other ways. In one example, the presentation component(s) 706 are not used when processes and operations are sufficiently automated that a need for human interaction is lessened or not needed. I/O ports 708 allow the computing device 700 to be logically coupled to other devices including the I/O components 710, some of which is built in. Implementations of the I/O components 710 include, for example but without limitation, a microphone, keyboard, mouse, joystick, pen, game pad, satellite dish, scanner, printer, wireless device, camera, etc.

The computing device 700 includes a bus 716 that directly or indirectly couples the following devices: the memory 702, the one or more processors 704, the one or more presentation components 706, the input/output (I/O) ports 708, the I/O components 710, a power supply 712, and a network component 714. The computing device 700 should not be interpreted as having any dependency or requirement related to any single component or combination of components illustrated therein. The bus 716 represents one or more busses (such as an address bus, data bus, or a combination thereof). Although the various blocks of FIG. 21 are shown with lines for the sake of clarity, some implementations blur functionality over various different components described herein.

The components of the computing device 700 may be connected by various interconnects. Such interconnects may include a Peripheral Component Interconnect (PCI), such as PCI Express, a Universal Serial Bus (USB), firewire (IEEE 1394), an optical bus structure, and the like. In another implementation, components of the computing device 700 may be interconnected by a network. For example, the memory 702 may be comprised of multiple physical memory units located in different physical locations interconnected by a network.

In some examples, the computing device 700 is communicatively coupled to a network 1018 using the network component 714. In some examples, the network component 714 includes a network interface card and/or computer-executable instructions (e.g., a driver) for operating the network interface card. In one example, communication between the computing device 700 and other devices occurs using any protocol or mechanism over a wired or wireless connection 720. In some examples, the network component 714 is operable to communicate data over public, private, or hybrid (public and private) connections using a transfer protocol, between devices wirelessly using short range communication technologies (e.g., near-field communication (NFC), Bluetooth® branded communications, or the like), or a combination thereof.

The connection 720 may include, but is not limited to, a modem, a Network Interface Card (NIC), an integrated network interface, a radio frequency transmitter/receiver, an infrared port, a USB connection or other interfaces for connecting the computing device 700 to other computing devices. The connection 720 may transmit and/or receive communication media.

Although described in connection with the computing device 700, examples of the disclosure are capable of implementation with numerous other general-purpose or special-purpose computing system environments, configurations, or devices. Implementations of well-known computing systems, environments, and/or configurations that are suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, VR devices, holographic device, and the like. Such systems or devices accept input from the user in any way, including from input devices such as a keyboard or pointing device, via gesture input, proximity input (such as by hovering), and/or via voice input.

Implementations of the disclosure, such as controllers or monitors, are described in the general context of computer-executable instructions, such as program modules, executed by one or more computers or other devices in software, firmware, hardware, or a combination thereof. In one example, the computer-executable instructions are organized into one or more computer-executable components or modules. Generally, program modules include, but are not limited to, routines, programs, objects, components, and data structures that perform particular tasks or implement particular abstract data types. In one example, aspects of the disclosure are implemented with any number and organization of such components or modules. For example, aspects of the disclosure are not limited to the specific computer-executable instructions or the specific components or modules illustrated in the figures and described herein. Other examples of the disclosure include different computer-executable instructions or components having more or less functionality than illustrated and described herein. In implementations involving a general-purpose computer, aspects of the disclosure transform the general-purpose computer into a special-purpose computing device when configured to execute the instructions described herein.

By way of example and not limitation, computer readable media comprises computer storage media and communication media. Computer storage media include volatile and nonvolatile, removable, and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. In one example, computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium used to store information for access by a computing device. In contrast, communication media typically embody computer readable instructions, data structures, program modules, or the like in a modulated data signal such as a carrier wave or other transport mechanism and include any information delivery media.

While various spatial and directional terms, including but not limited to top, bottom, lower, mid, lateral, horizontal, vertical, front and the like are used to describe the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Of course, those skilled in the art will recognize many modifications may be made to this configuration without departing from the scope or spirit of the claimed subject matter.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

Various operations of implementations are provided herein. In one implementation, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each implementation provided herein.

Any range or value given herein can be extended or altered without losing the effect sought, as will be apparent to the skilled person.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

As used in this application, the terms "component," "module," "system," "interface," and the like are generally intended to refer to a computer-related entity, either hardware, a combination of hardware and software, software, or software in execution. For example, a component may be, but is not limited to being, a process running on a processor, a processor, an object, an executable, a thread of execution, a program and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device, carrier or media. Of course, those skilled in the art will recognize many modifications may be made to this configuration without departing from the scope or spirit of the claimed subject matter.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more steps or less steps of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of this disclosure. Many other examples exist, each differing from others in matters of detail only.

What is claimed is:

1. An apparatus for airflow control, the apparatus comprising:
    a gantry configured to couple to an imaging system; and
    a gantry cover coupled to the gantry, the gantry cover including a first damper comprising a first plurality of diffuser perforations, and a second damper comprising a second plurality of diffuser perforations,
    wherein an alignment of the first plurality of diffuser perforations with respect to the second plurality of diffuser perforations is adjustable to define different airflow rates from a surface of the gantry toward a patient table, and
    wherein the first plurality of diffuser perforations and the second plurality of diffuser perforations each comprise a plurality of openings and the plurality of openings are configured having a varied density across the surface of the gantry.

2. The apparatus of claim 1, wherein the first damper is a top damper and the second damper is a bottom damper, and at least one of the first damper or the second damper is movable with respect to the other one of the first damper and the second damper.

3. The apparatus of claim 2, wherein one of the first damper or the second damper is configured in a fixed position.

4. The apparatus of claim 1, further comprising a third plurality of diffuser perforations in an imaging head coupled to an imaging arm of the gantry, wherein the imaging head is configured to capture images of a patient on the patient table.

5. The apparatus of claim 1, wherein the first damper is parallel to the second damper.

6. The apparatus of claim 1, wherein the gantry further comprises a cable management system.

7. The apparatus or claim 6, wherein the cable management system comprises a plurality of retaining members configured to retain cables within the gantry and separated from the first and second dampers.

8. The apparatus of claim 1, wherein the first damper is a top damper and the second damper is a bottom damper, and the bottom damper further comprises a light emitting diode (LED) panel.

9. The apparatus of claim 8, wherein the LED panel is configured to one of (i) display images or video or (ii) emit customized light.

10. The apparatus of claim 8, wherein the LED panel is a perforated panel having the second plurality of diffuser perforations.

11. The apparatus of claim 1, wherein the gantry further comprises a decontamination system having an environmental feedback element.

12. The apparatus of claim 11, wherein the environmental feedback element comprises at least one sensor, wherein the at least one sensor is configured to capture data and provide feedback on at least one of air volume, air speed, air pressure, temperature, humidity, and an amount of microbials and particles, and feedback from the sensors is used to control a treatment for air prior to passing through the gantry to the patient table.

13. An apparatus for airflow control, the apparatus comprising:
    a gantry configured to couple to an imaging system, wherein the gantry comprises a plurality of louvers along a portion of a lower surface of the gantry, wherein the plurality of louvers comprise a plurality of angled air directing elements;

a gantry cover coupled to the gantry, the gantry cover including a first damper comprising a first plurality of diffuser perforations, and a second damper comprising a second plurality of diffuser perforations, wherein an alignment of the first plurality of diffuser perforations with respect to the second plurality of diffuser perforations is adjustable to define different airflow rates from a surface of the gantry toward a patient table.

14. A medical imaging system, comprising:

a gantry having a gantry cover, wherein the gantry cover comprises:
- a top damper comprising a first plurality of diffuser perforations, and
- a bottom damper comprising a second plurality of diffuser perforations, wherein the bottom damper further comprises a light emitting diode (LED) panel and wherein the LED panel is configured to one of (i) display images or video or (ii) emit customized light; and an imaging apparatus comprising:
- an imaging head configured to capture images of a patient, the imaging head comprising a third plurality of diffuser perforations, and
- an imaging arm coupling the imaging head to the gantry and configured to support the imaging head.

15. The medical imaging system of claim 14, wherein the first plurality of diffuser perforations, the second plurality of diffuser perforations, and the third plurality of diffuser perforations are together configured to control a pressure zone under one or more surfaces of the gantry and imaging head that block airflow to an imaging area having a patient table.

16. The medical imaging system of claim 15, wherein the pressure zone comprises a laminar airflow.

17. The medical imaging system of claim 16, wherein the laminar airflow comprises unidirectional air under at least one of the gantry and the imaging head.

18. A method of controlling airflow in a patient imaging area, the method comprising:

configuring a gantry to couple to an imaging system; and configuring a gantry cover to couple to the gantry, the gantry cover including a first damper comprising a first plurality of diffuser perforations, and a second damper comprising a second plurality of diffuser perforations, wherein an alignment of the first plurality of diffuser perforations with respect to the second plurality of diffuser perforations is adjustable to define different airflow rates from a surface of the gantry toward a patient table, and wherein the first plurality of diffuser perforations and the second plurality of diffuser perforations each comprise a plurality of openings and the plurality of openings are configured having a varied density across the surface of the gantry.

19. A display comprising:

a plurality of LED display elements forming a display screen, wherein at least some LED display elements of the plurality of LED display elements are separated from other ones of the LED display elements by a gap to allow airflow therethrough; and an air supply configured to generate the airflow that passes through the gaps.

20. The display of claim 19, wherein the LED elements are spaced apart to define perforations in the display screen.

21. The display of claim 19, wherein the plurality of LED elements are mounted on a cover for a medical imaging gantry.

* * * * *